(12) United States Patent
Fukuzawa (10) Patent No.: US 7,432,960 B2
(45) Date of Patent: Oct. 7, 2008

(54) IMAGE GENERATING APPARATUS AND IMAGE GENERATING METHOD

(75) Inventor: Keiichi Fukuzawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1235 days.

(21) Appl. No.: 10/661,513

(22) Filed: Sep. 15, 2003

(65) Prior Publication Data

US 2004/0080626 A1 Apr. 29, 2004

(30) Foreign Application Priority Data

Sep. 26, 2002 (JP) ............................. 2002-281051
Aug. 25, 2003 (JP) ............................. 2003-208559

(51) Int. Cl.
*H04N 5/228* (2006.01)

(52) U.S. Cl. .................................. 348/222.1

(58) Field of Classification Search ............... 348/222.1
See application file for complete search history.

(56) References Cited

U.S. PATENT DOCUMENTS 5,640,202 A 6/1997 Kondo et al. ................. 348/222

5,786,851 A * 7/1998 Kondo et al. ............. 348/222.1

FOREIGN PATENT DOCUMENTS

CN 1314045 9/2001

* cited by examiner

*Primary Examiner*—James M Hannett
(74) *Attorney, Agent, or Firm*—Fitzpatrick, Cella, Harper & Scinto

(57) ABSTRACT

To generate motion picture image data making full use of the characteristics of a photographed image such as a high resolution and a high rate fetching (high frame rate), an image pickup apparatus comprises a camera unit for photographing a subject at predetermined time intervals and generating image pickup data and an encoding unit for encoding the image pickup data as motion picture image data having an image rate which is based on the predetermined time intervals. An optimum motion picture stream is output by changing the output mode of the encoded motion picture image data output from the encoding unit according to the number of photographing pixels in the camera unit and the image rate.

15 Claims, 11 Drawing Sheets

| 3LL | 3HL | 2HL | 1HL |
|-----|-----|-----|-----|
| 3LH | 3HH |     |     |
| 2LH |     | 2HH |     |
| 1LH |     | 1HH |     |

FIG. 9

| | LENGTH×WIDTH=TOTAL NUMBER (P) OF PIXELS | RATE (1/T) |
|---|---|---|
| QXGA | 2048×1536=3,150,000 | 1/2.9 |
| UXGA | 1600×1200=1,920,000 | 1/4.8 |
| SXVGA | 1280×960=1,230,000 | 1/7.5 |
| XGA | 1024×768=790,000 | 1/11.7 |
| SVGA | 800×600=480,000 | 1/19.2 |
| VGA | 640×480=310,000 | 1/30.0 |
| QVGA | 320×240=80,000 | 1/120.0 |

FIG. 10B

IMAGE GENERATING APPARATUS AND IMAGE GENERATING METHOD

BACKGROUND OF THE INVENTION

1. Filed of the Invention

The present invention relates to a technology of an image generating apparatus and an image generating method for fetching a motion picture at a variable frame rate and generating compresion-encoded image data.

2. Related Background Art

There are digital still cameras and digital video cameras as devices capable of photographing an image and recording and reproducing the image. Recent image pickup elements employ an increased number of pixels due to an advanced manufacturing technology, thereby the quality of images photographed by not only digital still cameras but also by digital video cameras using the image pickup elements is greatly improved (resolution of the images is increased).

When an image having a high resolution is generated using the cameras described above, although the photographing capability, image compression capability, recording capability, and the like of them are greatly influenced due to a large amount of image data, the operating conditions of the cameras are optimally set according to the respective cameras and the modes thereof by restricting a processing time and an amount of processing data.

For example, there is a digital video camera which records pickup data of 480×720 pixels in NTSC or 576×720 pixels in PAL (corresponding to 640×480 square pixels in VGA) at a rate of 30 frames/sec in a motion picture recording mode which assumes that a motion picture is output to a TV monitor, and which records pickup data of 1,230,000 pixels (corresponding to square pixels 1280×960 pixels in SXVGA) in a still image recording mode.

Further, there is a popular type digital still camera which records a still image of 3,000,000 pixels (corresponding to 2048×1536 pixels in QXGA) or more and also continuously photographs a motion picture at a rate of about 2 frames/sec.

In general, however, even a digital video camera and a digital still camera having an image pickup element including a large number of pixels can only photograph and record an image in a fixed pixel range that is uniquely determined according to a photographing mode and an image size set by a user, and it is difficult to optionally obtain a photographed image having a high resolution of, in particular, a motion picture.

In contrast, for the digital video cameras, users have a desire for executing photographing at a high rate, in addition to a desire for increasing the number of pixels. For example, there is the need for changing a frame rate to a high rate side even while a motion picture is being photographed. However, the increase in the frame rate not only increases a load on respective processing circuits but also causes a possibility that a reproduction unit or a display unit cannot cope with a motion picture photographed at a changed frame rate when the picture is reproduced. Thus, these problems must be overcome when a digital video camera that fulfills the need is actually manufactured as a product. In view of the above problems, there is conceived a motion picture photographing system that makes it possible to record a motion picture at a different frame rate by controlling the system by a host computer connected to a camera and the like as disclosed in U.S. Pat. Nos. 5,640,202 and 5,786,851, for example.

However, actually employed as the frame rate at which a motion picture is recorded is a predetermined frame rate set according to the system of a TV monitor and the like or a frame rate set under the control of a host computer as disclosed in the above US patents, and it cannot be attained that a user manipulating a video camera can optionally change the frame rate.

As described above, in the conventional technologies, the resolution of a photographed image is determined according to a preset image size. Further, since the number of frames to be processed per second, and the like are uniquely determined by the read-out time of an image pickup element, the processing time of an image compression unit, and the data transfer rate of a recording unit and the like, in the conventional system, a resolution and a frame rate cannot be selected on a camera side.

SUMMARY OF THE INVENTION

An object of the present invention is to solve the above-described problems.

Another object of the present invention is to provide an image generating apparatus and an image generating method capable of generating an image, in particular, a motion picture with an optional resolution or at an optional frame rate.

As a preferred embodiment for such objects, an image generating apparatus of the present invention includes image pickup means for picking up an object image at predetermined time intervals and generating image pickup data, encoding means for encoding the image pickup data as motion picture image data having an image rate which is based on the predetermined time intervals, output means for outputting the encoded motion picture image data, and control means for controlling the output means according to the number of pixels of the image pickup data picked up by the image pickup means and the image rate.

Further, an image generating method of the present invention includes the steps of picking up an object image at predetermined time intervals and generating image pickup data, encoding the image pickup data as motion picture image data having an image rate which is based on the predetermined time intervals, outputting the encoded motion picture image data, and controlling the output step according to the number of pixels of the image pickup data picked up in the image pickup step and the image rate.

Still other objects of the present invention, and the advantages thereof, will become fully apparent from the following detailed description of the embodiments.

DETAILED DESCRIPTION OF THE PREFERRED EMBODIMENTS

The preferred embodiment of the present invention will now be described in detail hereinafter with reference to the accompanying drawings.

Figure 1:
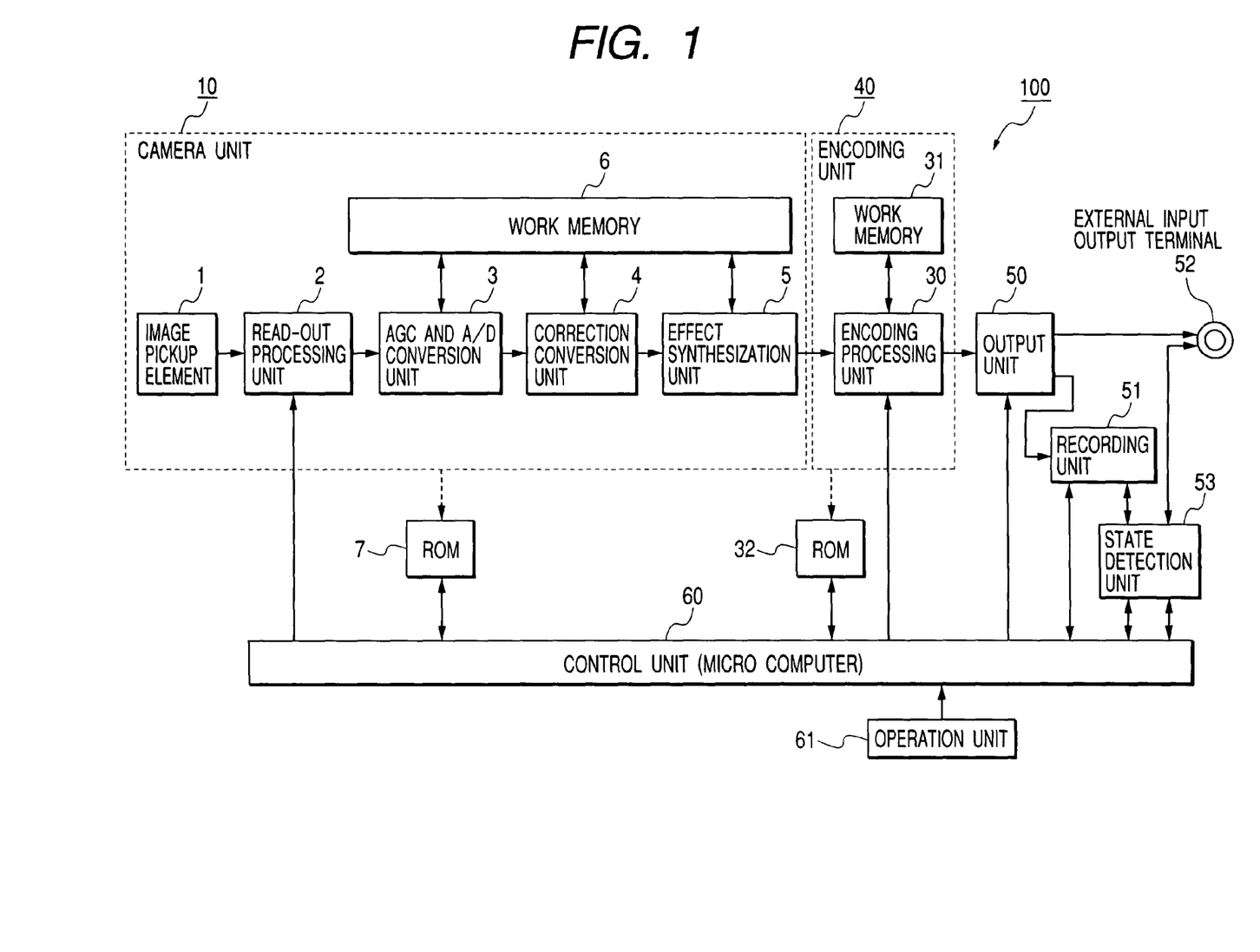
FIG. 1 is a block diagram of a digital video camera 100 as an embodiment of an image generating apparatus of the present invention.

FIG. 1 shows a block diagram of the overall system of a digital video camera 100 as an example of an image generating apparatus of the present invention.

In FIG. 1, reference numeral 1 denotes an image pickup element for converting optical information into an electric signal, 2 denotes a read-out processing unit for reading out an image signal from the image pickup element 1, 3 denotes an ACG and AID conversion unit for subjecting the read out image signal to gain correction and then convening the image signal into digital data, 4 denotes a correction conversion unit for subjecting the read out digital data to correction processing such as γ correction and the like and converting the digital data into image data in a luminance color difference form (Y,Cr,Cb), 5 denotes an effect synthesization unit for subjecting the image data processed by the correction conversion unit 4 to arithmetic operation so that the image data is added with an image effect, 6 denotes a work memory composed of a RAM and the like for temporarily storing the processed data in the respective units 3 to 5, and 10 denotes a camera unit composed of the respective units 1 to 6 and a ROM 7 which will be described later. Note that the ROM 7 stores information as to the image processing capability (photographing capability) of the camera unit 10.

Further, reference numeral 30 denotes an encoding processing unit for subjecting the image data input thereto to compression-encoding processing, and 31 denotes a work memory composed of a RAM and the like into which the encoding processing unit 30 temporarily stores the data being processed. Note that the encoding processing unit 30 compression-encodes an image using the JPEG 2000 system (including Motion-JPEG 2000) that is an image compression format. Further, reference numeral 40 denotes an encoding unit composed of the encoding processing unit 30, the work memory 31 and the respective blocks of a ROM 32 which will be described later. Note that the ROM 32 stores information as to the image encoding capability of the encoding processing unit 30.

Further, reference numeral 50 denotes an output unit for outputting the compressed image data subjected to the compression-encoding processing in the encoding processing unit 30, 51 denotes a recording unit for recording the compressed image data output from the output unit 50 and 52 denotes an external input output terminal for inputting and outputting the compressed image data output from the output unit 50, other necessary control information, and the like from and to the outside. An external recording unit, monitor, personal computer (PC), server, and the like are connected to the external input output terminal 52. Reference numeral 53 denotes a state detection unit for detecting the state of the recording unit 51 and the state of the external recording unit and the like connected to the external input output terminal 52.

Reference numeral 60 denotes a control unit composed of a micro-computer and the like for controlling the respective units of the digital video camera 100, and 61 denotes an operation unit for inputting various commands. The control unit 60 appropriately controls the operations of the respective units according to a user command input from the operation unit 61, the information from the respective ROMs, the information from the state detection unit 53, and the like.

Next, the operation of the digital video camera 100 shown in FIG. 1 will be explained in detail with reference to FIG. 1. The processing flow of image data to be generated will be explained with reference to FIG. 1.

First, the image of an object is converged on the image pickup element 1 through a lens (not shown) and converted into an electric signal. At this time, each of the inputs from all the image pickup elements (sensors) is converted into an electric signal of each pixel. Next, the electric signals are read out by the read-out processing unit 2 according to a control signal from the control unit 60 which designates the number of pixels (P) and a read-out time (T), thereby generating image signals.

Next, the image signals are subjected to gain adjustment and converted into digital data in the ACG and A/D conversion unit 3. The digital data is stored once in the work memory 6.

When a predetermined amount of data (for example, an amount of data of an image of one frame) is stored in the work memory 6, the correction conversion unit 4 starts to correct and convert the digital data stored in the work memory 6. The correction conversion unit 4 sequentially reads out the digital data from the work memory 6, subjects it to photovoltage-conversion correction (γ correction), further subjects the digital data to image data conversion into the luminance and color difference format (Y,Cb, Cr), and outputs the digital data at a timing based on the read-out time of the read-out processing unit 2. The digital data is temporarily stored in the work memory 6 as needed, after the digital data is converted in the correction conversion unit 4.

The effect synthesization unit 5 starts an operation based on output timing of the correction conversion unit 4. The effect synthesization unit 5 is a section for providing the image data (Y, Cb, Cr data) fetched from the work memory 6 with a better-looking effect by subjecting it to a digital arithmetic operation. When the processing in the correction conversion unit 4 is completed, the effect synthesization unit 5 reads out the YCbCr data from the work memory 6, subjects the data to digital effect processing for making the color of an overall image to sepia by changing the ratio of Y, Cb, Cr or subjects it to an arithmetic operation processing for providing a scene change portion with a wipe effect by synthesizing the digital data with a previous image, and thereafter transfers the image data to the encoding unit 40. Note that the processing in the effect synthesization unit 5 may be optionally executed when it is selected or set by the user. When the processing in the effect synthesization unit 5 is not executed, the image data processed by the correction conversion unit 4 is read out from the work memory 6 and transferred to the encoding unit 40, bypassing the processing in the effect synthesization unit 5.

The encoding processing unit 30 in the encoding unit 40 compression-encodes the image data received thereby according to control information which is supplied from the control unit 60 to designate a resolution and a frame processing time. Although an intermediate code generated at a processing step is temporarily stored in the work memory 31, the image data, which has been finally compression-encoded, is transferred to the output unit 50 and recorded in the recording unit 51 or transferred to the external unit from the external input output terminal 52.

Further, the state detection unit 53 is a block for detecting and monitoring the recording state of the recording unit 51 or the receiving/recording state of the external unit connected to the external input output terminal 52. A detected state signal is transferred to the control unit 60 as needed and used to control the respective units.

Next, the operations characteristic to the present invention will be explained below.

First, in the digital video camera 100 of this embodiment, a "resolution priority mode" and a "high rate fetching priority mode" can be set as a photographing mode using the operation unit 61. When the user designates any one of the resolution priority mode and the high rate fetching priority mode, the indicated information is transmitted from the operation unit 61 to the control unit 60.

Then, the control unit 60 reads the performance of the camera unit 10 from the ROM 7 which stores the information of the capability of the camera unit 10. The performance of the camera unit 10 described here is shown by the information of a maximum number of pixels (Pmax) that can be read out, a read-out time (Tmax) when the maximum number of pixels (Pmax) is read out, a read-out time (Tmin) when reading-out is executed at a high rate, and the number of pixels (Pmin) that can be read out in the high rate reading-out.

A method of reading out image data employed when a CMOS sensor is used as the image pickup element 1 will be explained here using FIGS. 2 and 3.

Figure 2:
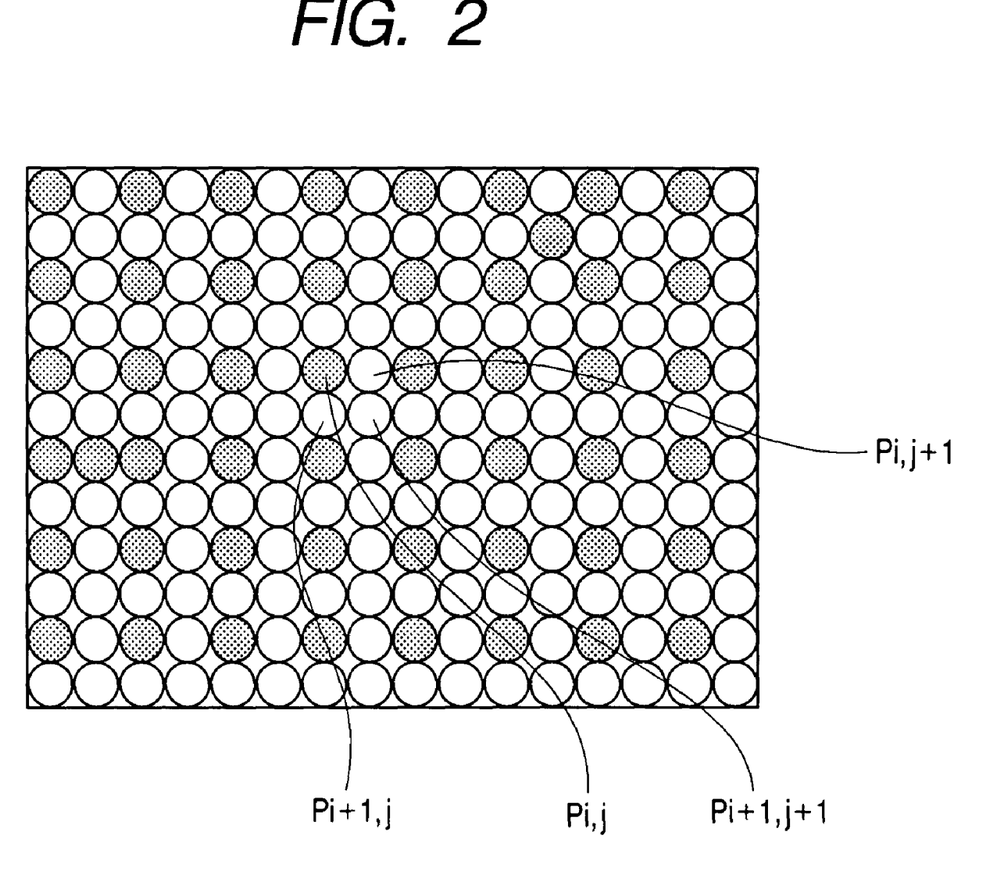
FIG. 2 explains read-out executed by a CMOS image pickup element.
Figure 3:
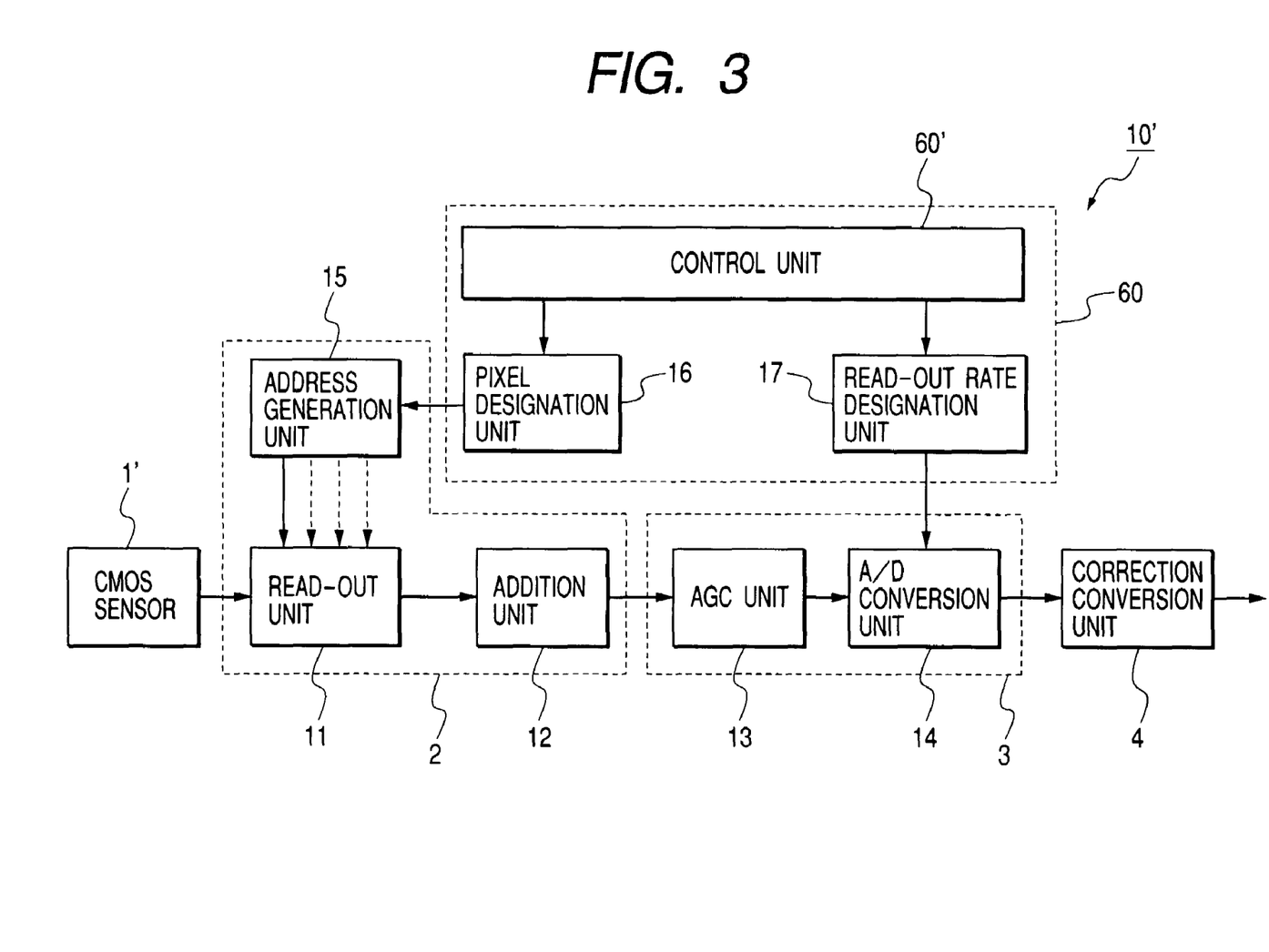
FIG. 3 is a block diagram explaining a camera unit 10' to which the present invention is applied.

FIG. 2 explains the arrangement of pixels in an image pickup element, and FIG. 3 is a block diagram of a camera unit 10' showing a portion of the arrangement of the camera unit 10 of FIG. 1 in detail. First, a method of reading out the image data will be explained using the block diagram of FIG. 3.

The camera unit 10' is composed of a CMOS sensor unit 1' serving as the image pickup element, a read-out unit 11, an addition unit 12, and an address generation unit 15 serving as the detailed arrangement of the read-out processing unit 2, an AGC unit 13 and an A/D conversion unit 14 serving as the detailed arrangement of the ACG and A/D conversion unit 3, a pixel designation unit 16, a read-out rate designation unit 17 serving as the detailed arrangement of the control unit 60, a control unit 60' composed of other control systems, and further the correction conversion unit 4.

The operation of the camera unit 10' of FIG. 3 will be explained.

When the number of pixels is designated by the pixel designation unit 16 under the control of the control unit 60', information for designating the pixels to be read out is transferred to the address generation unit 15.

If it is designated here to read out the maximum number of pixels that can be read out, the address generation unit 15 generates an address, which causes electric signals to be sequentially read out from all the pixels of the CMOS sensor 1', to the read-out unit 11. At this time, in FIG. 2, the electric signals of all the pixels as shown by Pi, j; Pi, j+1; ... ; Pi+1, j; Pi+1, j+1; ... are sequentially read out. In this case, since all the pixels are read out, the maximum time Tmax is necessary to read one image.

Further, if it is designated to read out one fourth the maximum number of pixels, the address generation unit 15 generates an address for reading out the pixels of the CMOS sensor 1' in a unit of four pixels to the read-out unit 11. At this time, in FIG. 2, one signal is read out from Pi, j; Pi, j+1; Pi+1, j; Pi+1, j+1 according to a rule determined thereto so that one pixel is read out from adjacent four pixels (for example, only Pi, j of Pi, j; Pi, j+1; Pi+1, j; Pi+1, j+1 are read). That is, since all the pixels of the one image is read out in the unit of four pixels, they can be read in a read-out time that is one fourth the maximum time Tmax.

As described above, the read-out unit 11 reads out the electric signals based on the designated number of pixels, and the read-out electric signals are added by the addition unit 12, subjected to gain adjustment in the AGC unit 13, and converted into the digital data in the A/D conversion unit 14. Since the electric signals are added in the addition unit 12, this provides the same result as that of a case in which the electric signals are processed by a half-band low-pass filter, thereby eliminating influence of aliasing distortion, which is caused in offset sampling of.

As described above, since a smaller number of pixels (P) to be read out decreases the read-out time (T) of one image, the value of the rate designated by the read-out rate designation unit 17 is changed under the control of the control unit 60. That is, the read-out rate designation unit 17 generates a timing signal corresponding to a present read-out time of one image. The A/D conversion unit 14 executes processing in response to the timing signal as well as notifies a processing start timing to the correction conversion unit 4.

As described above, since the number of pixels (P) and the read-out time (rate) (T) approximately have the relationship shown by the following expression (1):

$$P \times T = \text{constant} \tag{1}$$

Accordingly, when P or T is set by the user, T or P paired with each other can be determined from the maximum capability of the image pickup element.

Figure 9:
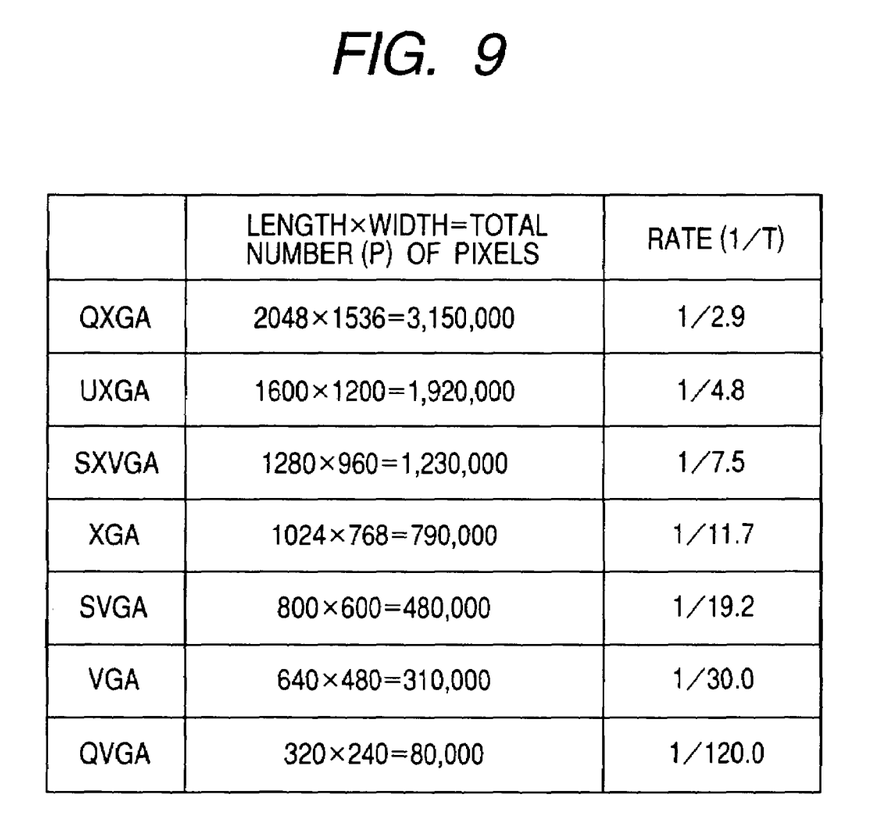
FIG. 9 is a table showing the relationship between the number of pixels and a frame processing time.

For example, referring to FIG. 9 to explain the number of pixels (P) and the rate (T) of an image pickup element having 3,000,000 pixels, the rate is set to 30 frames/sec in an ordinary motion picture (VGA size). When, however, 4 pixels are read out together as described above, since the number of pixels is reduced to ¼, it is possible to read out the pixels at a rate of 120 frames/sec. Conversely, when an image pickup element has the number of pixels twice as many as that of VGA, an image having a maximum number of 1,300,000 pixels (SX-VGA) can be read out at a rate of 7.5 frames/sec.

As described above, since the CMOS sensor has the maximum read-out pixel (Pmax) and the maximum read-out time (Tmax) as its performance, the user can optionally select in this system any of them or an intermediate number of pixels and an intermediate read-out time.

Next, the reading method employed when the image pickup element 1 is composed of a CCD image pickup element will be explained with reference to FIGS. 4A and 4B and FIGS. 5A and 5B.

An operation for reading out an ordinary overall image will be explained with reference to FIG. 4A.

The charges accumulated in the CCD image pickup element are vertically transferred through a CCD light receiving unit 20 serving as an image pickup element surface at timing generated by a timing generator (TG) 22. The charges transferred vertically are transferred to the ACG and A/D conversion unit 3 in a line unit by a horizontal transfer unit 21. As described above, the CCD image pickup element employs such a transfer system that all the pixels are vertically transferred and then transferred horizontally. Note that the CCD light receiving unit 20 serves as a read-out area in its entirety.

Figure 5A:
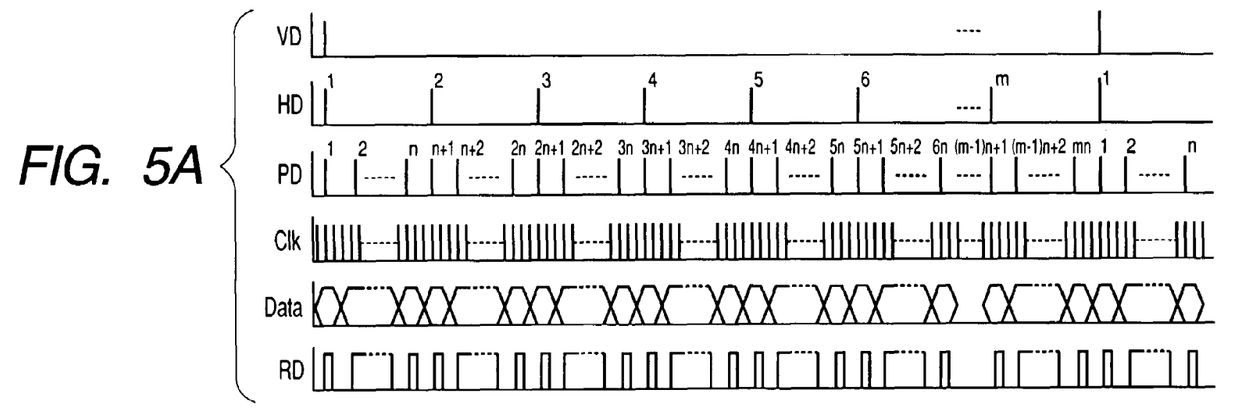
FIGS. 5A and 5B are timing charts of the read-out executed by the CCD image pickup element.

FIG. 5A shows in time-series a vertical synchronous signal (VD), horizontal synchronous signal (HD), a pixel reading signal (PD), clock signal (Clk) acting as the reference signal thereof, an operation signal in A/D conversion capable of reading A/D conversion data at 3 Clk, and timing (RD) at which the A/D conversion data is read.

Figure 4A:
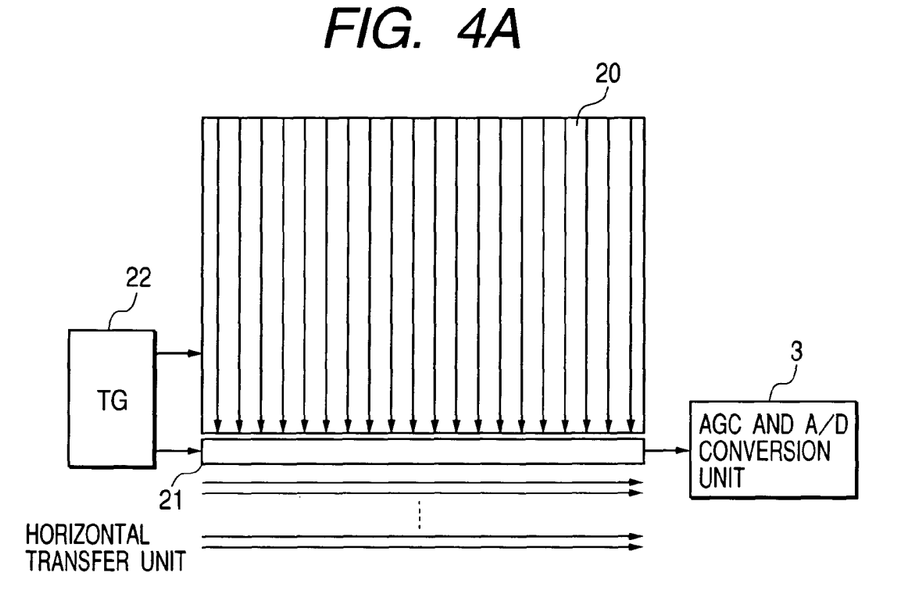
FIGS. 4A and 4B explain read-out executed by a CCD image pickup element.
Figure 7:
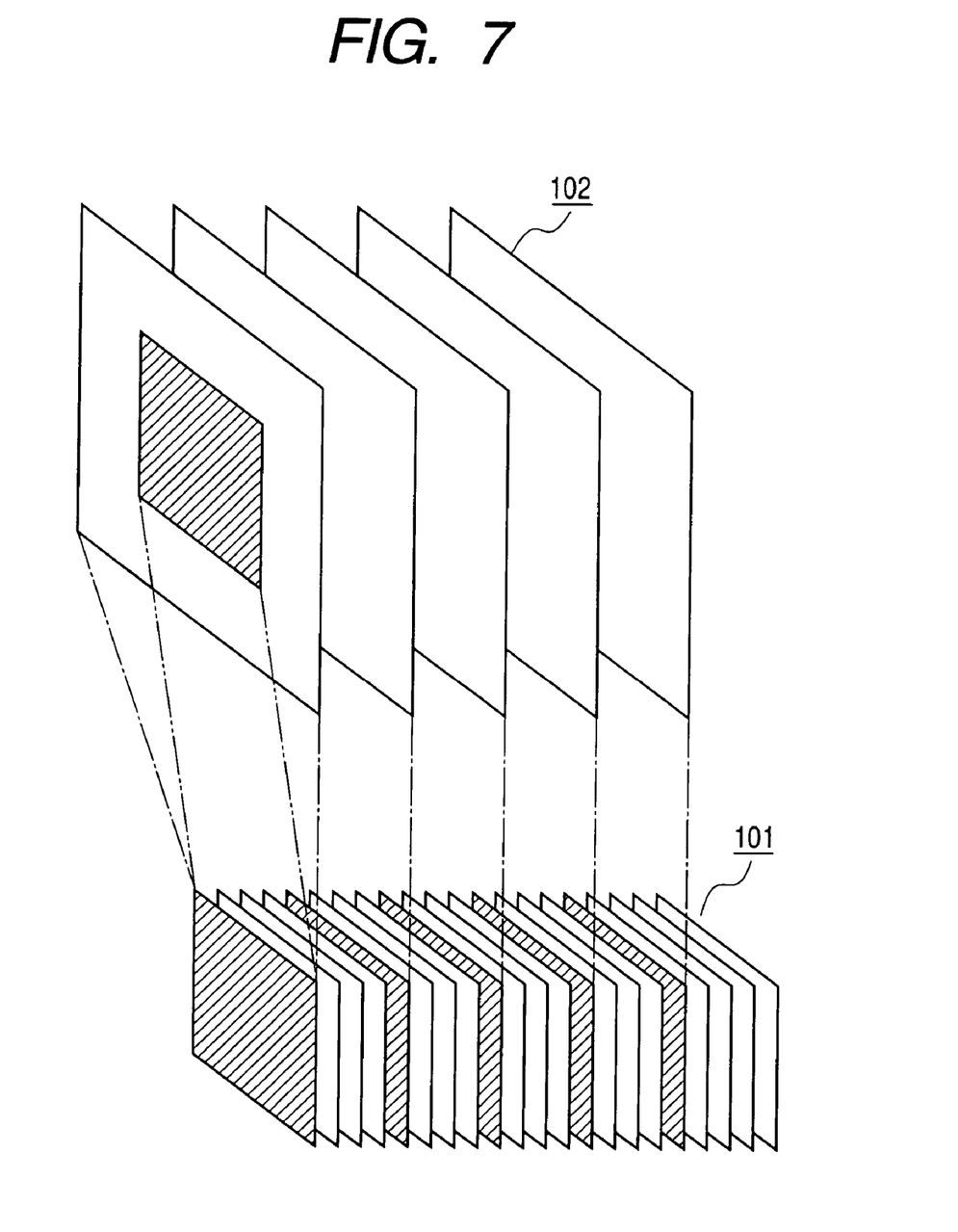
FIG. 7 explains the relationship between the number of pixels and a frame processing time.

As shown in FIG. 4A, the pixel (m×n) data of the light receiving unit 20 is read at the timing PD that is in synchronism with the vertical synchronous signal VD and the horizontal synchronous signal HD shown in FIG. 5, and subjected to A/D conversion at the timing RD. Note that FIG. 7 shows an image in which the data of all the images 102 is read at the timing of the vertical synchronous signal VD.

Figure 4B:
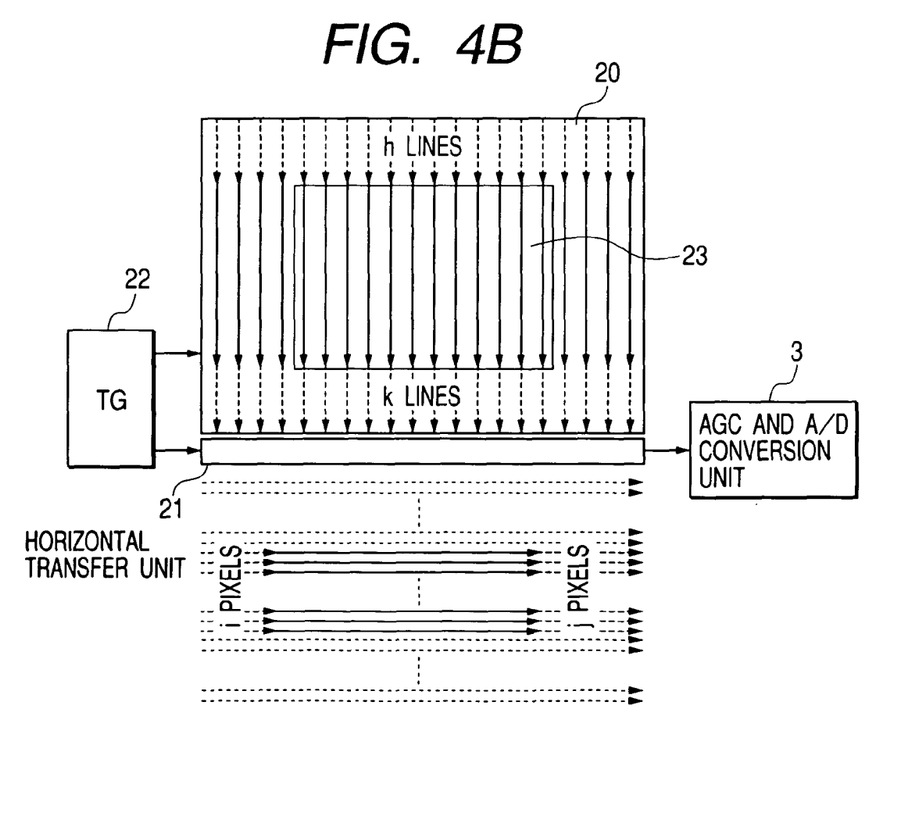

Next, a case in which the CCD image pickup element reads out data having a different resolution (a different number of pixels) is explained with reference to FIG. 4B. In FIG. 4B, when a read-out area (m'×n') 23 is composed of an area including the number of pixels designated by the pixel designation unit 16, in the CCD light receiving unit 20, a method of reading out the data of the read-out area (m'×n') 23 will be explained below. Note that FIG. 5B shows timing at which processing is executed in time-series.

Figure 5B:
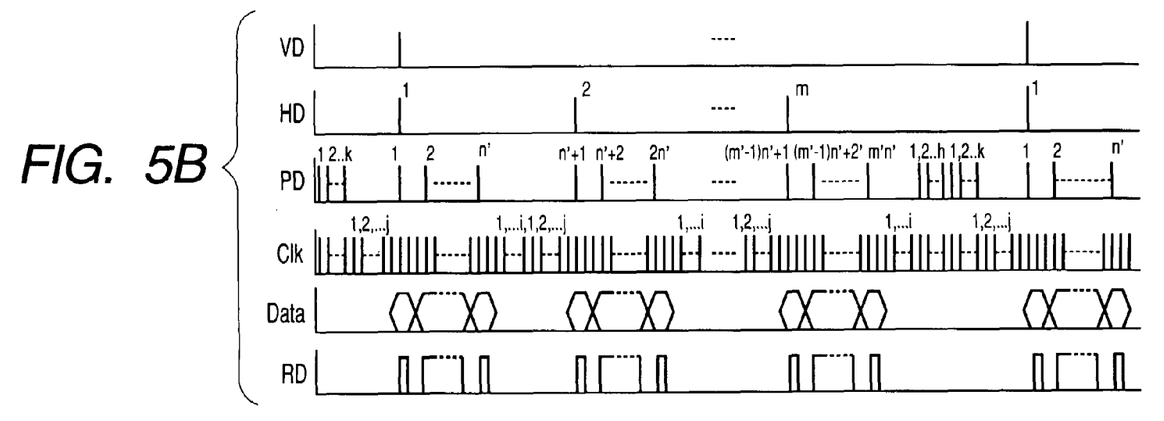

In FIG. 4B, first, when pixels are transferred in a vertical direction, the pixels located under the read-out area 23 (pixels of k lines in a vertical pixel direction) are skipped at a high rate in synchronism with the clock signal Clk (PD 1, 2, . . . , k of in FIG. 5B). Then, when line data (k+1) including the data in the the read-out area 23 is transferred to the ACG and A/D conversion unit 3 by the horizontal transfer unit 21, initial j pixels are skipped at a high rate (Clk 1, 2, . . . , i in FIG. 5B), and pixels j+1 to j+n' in the read-out area 23 are subjected to A/D conversion processing in synchronism with the clock Clk (PD 1, 2, . . . , n' of FIG. 5B). The remaining i pixels are skipped at a high rate similarly to the j pixels (Clk 1, . . . , i of FIG. 5B). The above operations are repeated for m' lines (PD n'+1, n'+2, . . . , m'n' and Clk 1, . . . , i in FIG. 5B), and the pixels of the remaining h lines are skipped vertically at the high rate similarly to the k lines (PD 1, 2, . . . , h in FIG. 5B). Note that FIG. 7 shows an image in which the data of a pixel area 101 which is a part of the data of all the images 102 is read by the processing described above at timing of the vertical synchronous signal VD which is shorter than the timing at which all the pixels are fetched.

As described above, in the CDD image pickup element, aliasing distortion due to sampling is not caused because pixels are partly read out in place of thinning-out reading. In contrast, the portions skipped at the high rate require a somewhat overhead processing time. However, since the pixel data other than that in the effective the read-out area 23 is transferred at the high rate also in the CCD image pickup element, if a small number of pixels (P=n×m) is read out, one image can be read out in a short time (T), thereby the expression (1) can be established similarly to the CMOS image pickup element.

Further, one of the features of the partial reading executed by the CCD image pickup element resides in that the pixels (n×m) to be clipped can be relatively optionally set differently from the CCD image pickup element in which a resolution is changed by four times each. Accordingly, it is possible to construct a camera system capable of relatively optionally select the number of pixels as shown in FIG. 9.

From what has been described above, the user can select a photographing mode so that the number of pixels and the rate have a complementary relationship in any of the CMOS and CCD image pickup elements. Further, an image can be read out so that the image pickup element can exhibit its maximum capability.

Next, an arrangement for compressing and encoding the image data read out from the image pickup element in the encoding unit 40 in FIG. 1 as described above will be specifically explained with reference to FIG. 6.

Figure 6:
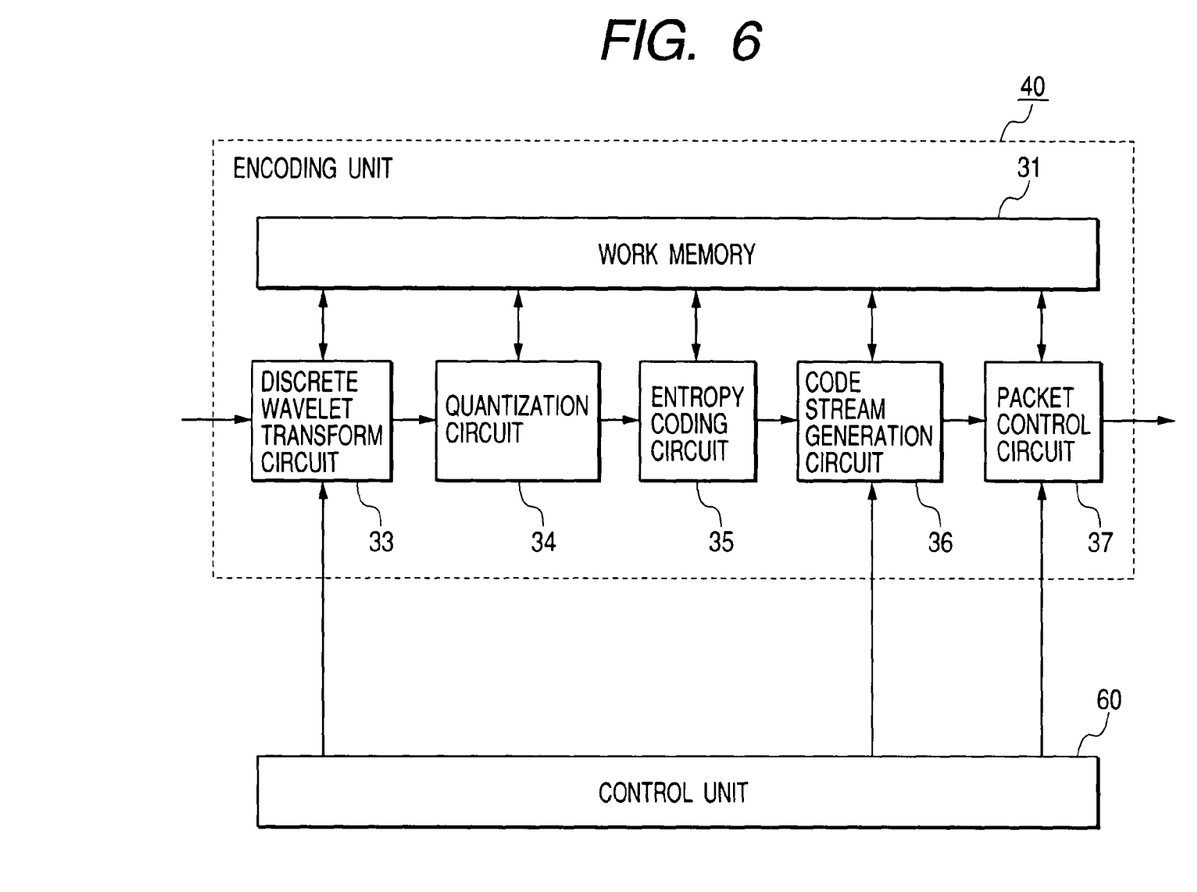
FIG. 6 is a block diagram explaining an encoding unit 40 to which the present invention is applied.

In FIG. 6, the encoding unit 40 is composed of the work memory 31, a discrete wavelet transform circuit 33, a quantization circuit 34, an entropy coding circuit 35, a code stream generation circuit 36, and a packet control circuit 37 as its detailed arrangement. Note that the above units 33 to 37 are processing blocks for constituting the encoding processing unit 30 described above.

First, the frame processing time and the number of processing pixels in the encoding unit 40 are set such that an operation is executed based on the number of pixels (P) and the read-out time (T) determined by the control unit 60 according to whether the user sets the resolution priority mode or the high rate capture mode described above.

This embodiment assumes that the encoding unit 40 can deal with the performance of the camera unit 10, i.e., the maximum number of read-out pixels (Pmax) and the shortest frame read-out time (Tmin). That is, the encoding unit 40 is equipped with the size of the work memory 31 and the arithmetic operation capabilities in the respective blocks, which are set such that a frame image having the number of pixels (P) and the frame read-out time (T), which are uniquely set by the expression (1) according to the performance of the camera unit 10, can be processed in real time.

The discrete wavelet transform circuit 33 subjects the input image data to sub-band coding according to the set number of pixels and processing time. According to the discrete wavelet transform circuit 33 employing the JPEG 2000 system used here, the image data is two-dimensionally sub-band coded to L- and H-components in horizontal and vertical directions and converted into LL, LH, HL, and HH sub-band coefficients. The LL component of these components is subjected to two-dimensional discrete wavelet transform again, thereby 2LL, 2LH, 2HL, and 2HH sub-band coefficients are obtained. Further, when recursive processing for subjecting the 2LL component to the two-dimensional discrete wavelet transform again is executed a predetermined number of times, important data is concentrated to the LL component and a noise component is concentrated to the HH component. When the image data is adaptively quantized by the quantization circuit 34 making use of the above characteristics, the image data can be compressed.

Figure 8:
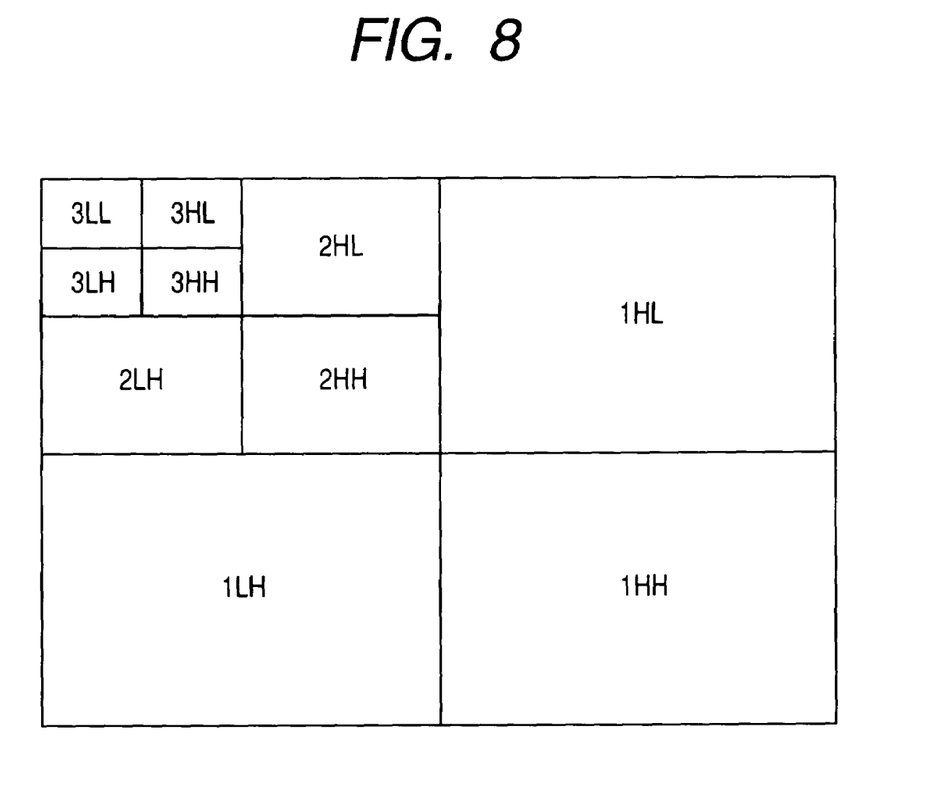
FIG. 8 explains a sub-band of JPEG 2000.

FIG. 8 conceptually shows the relationship between the sub-band coefficients and the image data when the two-dimensional discrete wavelet transform is executed three times. As described above, in the discrete wavelet transform of the JPEG 2000 system, the data encoded as to the resolution is encoded in the scalability structure of the resolution in order to code the image data recursively. Specifically, encoded data having the number of pixels (resolution) reduced by one fourth each is generated as shown below.
all the images >1LL>2LL, . . . >nLL
where, (n−1) LL=nLL+nHL+nLH+nHH Next, the entropy coding circuit 35 further compresses the intermediately encoded image data subjected to the discrete wavelet transform. Although the entropy coding is not described here in detail, it breaks down quantized data to bit plains in the unit of adjacent pixel blocks (code blocks), and the binary data of each bit plain is arithmetic-encoded based on a context model. The data encoded using the respective bit plains contributes to improve the quality of a reproduced image being transmitted, by optimally setting an encoding order. That is, the encoded data of the respective code blocks is divided into layers having a correlation with the quality of a reproduced image being transmitted.

The data encoded as described above is minutely divided into the layers of the code blocks, and a code stream is generated by arranging the encoded data as packets based on a predetermined character. The character arranges the encoded data, which is located at similar positions and has similar image quality, as a packet. The packets of the code stream are generated by the code stream generation circuit 36.

Further, when the JPEG 2000 system is used, some characteristic functions can be realized by variously arranging the packets of the code stream. For example, when the packets are preferentially arranged in the order of higher layer (in the order of good SN ratio), the code stream is sequentially decoded such that rough-quality image (image having a bad SN ratio) is gradually made to a smooth image (image having a good SN ratio). Further, when the packets are preferentially arranged in the order of the hierarchy of the sub-bands of the discrete wavelet transform described above, the code stream is sequentially decoded such that a blurred image (image having a bad resolution) is made to a clear image (image having a good resolution). The scalability functions as described above are called an SN scalability and a resolution scalability.

In this embodiment, the scalabilities are changed by the code stream generation circuit 36 according to the number of pixels and the rate set by the control unit 60. Specifically, in a high resolution image (high pixel-density image) in which the frame rate of a motion picture is 30 frames/sec or less, the packets of the code stream are arranged in the order of the the SN scalability and output to the packet control circuit 37, and in a high rate image having a frame rate exceeding 30 frames/sec, the packets of the code stream are arranged in the order of the resolution scalability and output to the packet control circuit 37.

The packet control circuit 37 is a circuit for controlling the mode of the code stream generated as described above, before it is output to the output unit 50 at a rear stage. Although the packet control circuit 37 ordinarily outputs the generated code stream as it is, when control signal according to a recording state is output from the control unit 60, the packet control circuit 37 outputs the code stream according to the control information. The arrangement for outputting the code stream according to the control information will be explained below.

As shown in FIG. 1, the digital video camera 100 of this embodiment includes the state detection unit 53 for detecting and monitoring the recording state or the receiving state of the recording unit 51 or the external unit connected to the external input output terminal 52, and the control unit 60 for controlling the operations of the respective units according to the state information detected therein. For example, when the recording unit 51 is busy, even if the code stream generated by the encoding unit 40 is output from the output unit 50, it cannot be recorded. Thus, when the recording state detection unit 53 detects the busy state of the recording unit 51, it notifies the busy state to the control unit 60 as information. When the control unit 60 receives this state information, the packet control circuit 37 stops transmission of the packets of the code stream in a frame unit and performs control such that a predetermined frame image finish sequence is executed. That is, when the recording unit 51 is busy, the control unit 60 performs control such that all the encoded data of the respective frame is not output, while only a predetermined number of packets are output and transfer of the packets exceeding the predetermined number of the packets is stopped.

The same control can be performed to the external recording unit connected to the external input output terminal 52 and to the display unit likewise, as well as the recording unit 51. When the recording state detection unit 53 receives the status of the external unit, such as the receiving/recording states and the like, through the external input output terminal 52 by means of a command communication and outputs the state information to the control unit 60, the control unit 60 can control the output of the packet control circuit 37 according to the state of the external unit.

Since the scalability functions of the JPEG 2000 are set in the order of the packets, even if the encoded data of the respective frames is cancelled halfway, an image having appropriate quality can be decoded. Specifically, since the SN scalability is employed in a motion picture having high image quality and a low rate, even if the encoded data of the respective frames of the image is cancelled halfway, it is possible to reproduce an image having an optimum image quality and the deterioration of the quality of the image can be minimized. In contrast, since the resolution scalability is employed in a motion picture having a low pixel-density and high rate, even if the encoded data of the respective frames of the image is cancelled halfway, it is possible to uniformly reproduce an entire image, thereby the high rate motion of an object, which can be hardly predicted, can be fetched.

Note that, in this embodiment, header information (the header information of a motion JPEG 2000 file format, and the like), which is necessary in filing processing executed after the code stream are recorded in the recording unit 51, as well as the cancel of transmission of the packets, is stored and held in the memory region of the control unit 60. On the completion of recording of the stream information, the header information is transferred to the recording unit 51 and a file format is generated, thereby the recording is finished. The above processing is executed likewise when the header information is output to the external recording unit.

Note that although the present invention describes that the file format is generated to the recording unit 51 after a series of the motion picture recording operation is finished, it is also possible to write the file header at every predetermined time making use of the moof Box function of the Motion JPEG 2000.

Although what has been described above is processing executed assuming that the encoding unit 40 can deal with the maximum number of red-out pixels (Pmax) and the shortest frame read-out time (Tmin), processing executed in in other cases will be explained below.

Here, processing will be described which is executed when the performance of the encoding unit 40 is inferior to that of the camera unit 10. Specifically, this case assumes that the encoding unit 40 is not equipped with the size of the work memory 31 and an arithmetic operation processing capabilities capable of processing at real time the frame image having the number of pixels (P) and the frame read-out time (T), which are uniquely set by the expression (1) according to the performance of the camera unit 10.

The operation in the above case will be explained with reference to FIG. 1.

First, when the user sets any one of the resolution priority mode and the high rate fetching priority mode, the control unit 60 receives this information and reads out the performance information (Pmax, Tmax) of the camera unit 10 from the ROM 7. The control unit 60 further reads out the encoding performance information (P'max, T'min) of encoding unit 40 from the ROM 32. The encoding performance information is represented by the processing rates of the respective blocks in the encoding unit 40, the capacity of the work memory 31, and the like.

Here, when the photographing mode designated by the user is the resolution priority mode, P shown by the following expression (2) is selected.

$$P = \mathrm{Min}\,(P\mathrm{max}, P'\mathrm{max}) \qquad (2)$$

That is, the largest value of the number of pixels that can be processed by both the encoding unit 40 and the camera unit 10 is selected. Then, the processing rate T is calculated from the expression (1), and the number of pixels and the rate are set to the camera unit 10 and the encoding unit 40. Subsequent operations are the same as those of the respective blocks described above.

In contrast, when the user selects the high rate fetching priority mode, the processing rate T is selected from the following expression (3).

$$T = \text{Max} (T\text{min}, T'\text{min}) \tag{3}$$

That is, the smallest value of the processing rates that can be processed by both the encoding unit 40 and the camera unit 10 is selected. Then, the number of pixels P is selected from the expression (1), and the number of pixels and the processing rate are set to the camera unit 10 and the encoding unit 40. Subsequent operations are the same as those of the respective blocks described above.

As explained above, since the processing capabilities of the camera unit 10 and the encoding unit 40 are separately stored and held in the ROM in this embodiment, when there is another compatible camera unit, it is possible to exhibit a maximum capability as a system by comparing its performance in the same manner.

Further, in the system of this embodiment, since the camera unit 10 can execute partial read-out, and the like, the user can select the photographing mode. However, when another high pixel-density camera unit, which cannot execute the partial read-out, and the like, is combined with the encoding unit 40 described above, the code stream is automatically generated in the resolution priority model and when a low pixel-density camera unit, which can execute read-out at a high rate, is combined with the encoding unit 40 inversely, the code stream is automatically generated in the high rate fetching priority mode and the system can generate the code stream in an optimum mode without the need of selection made by the user.

The operation described above will be explained with reference to the flowchart of FIG. 10. That is, FIG. 10 shows an operation flowchart of the digital video camera 100.

Figures 10, 10A:
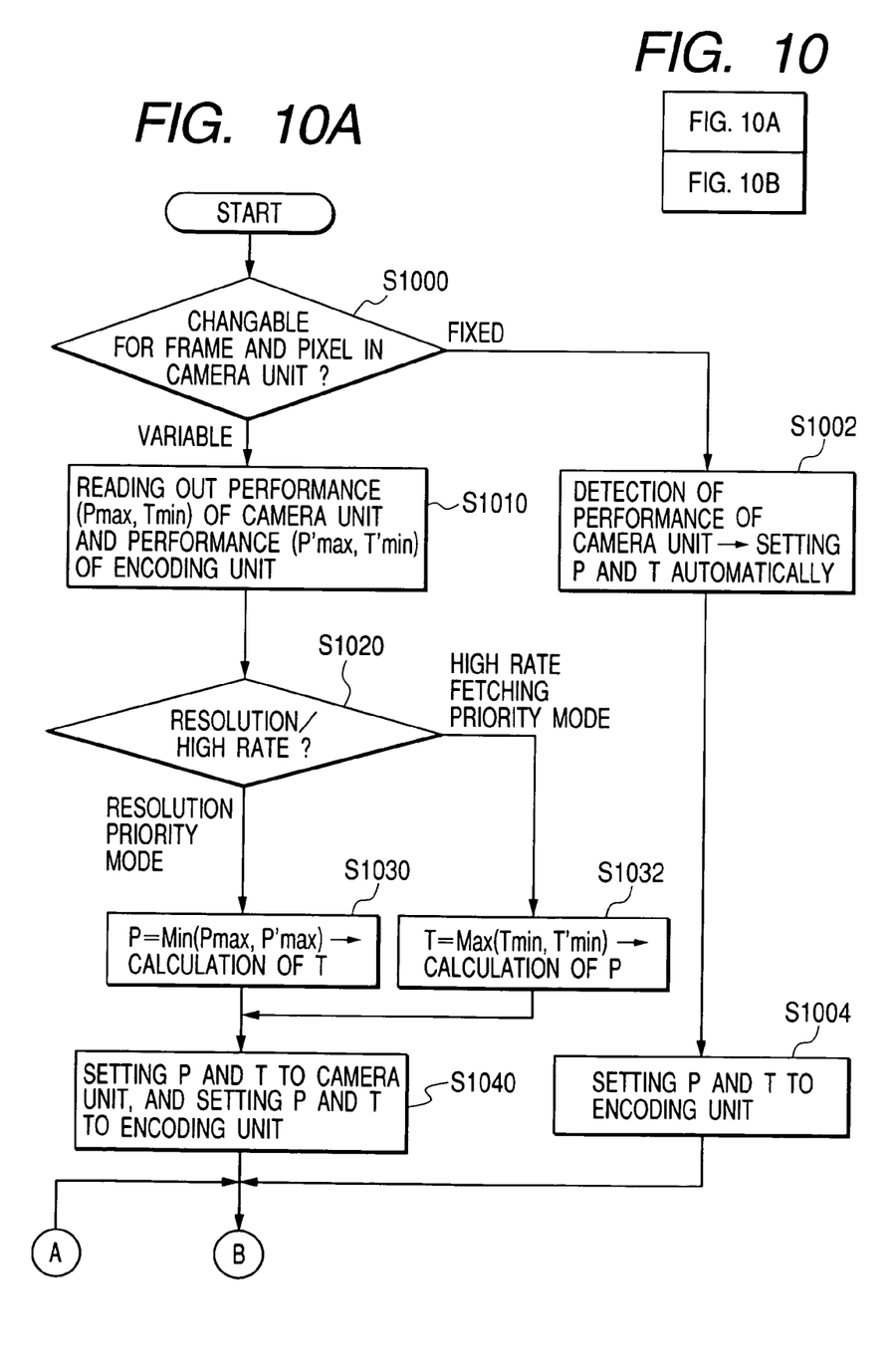
FIG. 10 which is composed of FIGS. 10A and 10B is a flowchart explaining the operation of the digital video camera 100.

In FIG. 10, first, the control unit 60 determines whether or not the camera unit 10 can partially read out P pixels from all the pixels and whether or not the read-out time (T) of one frame (P pixels) is variable (step S1000).

When the determination at step S1000 is "variable", i.e. when the number of pixels (P) to be read out and the frame rate (T) are variable, the camera performance information (Pmax, Tmax) is read out from the ROM 7 as well as the encoding performance information (P'max, T'min) is read from the ROM 32 (step S1010).

Next, the control unit 60 determines whether or not the photographing mode designated by the user using the operation unit 61 is the resolution priority mode due to high pixel-density or the high rate fetching priority mode (step S1020).

When it is determined by the control unit 60 that the "resolution priority mode" is designated as the photographing mode, the maximum number of pixels, which can be processed by both the camera unit 10 and the encoding unit 40, is determined from the expression (2), and the rate (T) corresponding to the number of pixels (P) is calculated from the expression (1) (step S1030).

In contrast, when it is determined by the control unit 60 that the photographing mode is designated to the "high rate fetching priority mode", the minimum processing time, which can be processed by both the camera unit 10 and the encoding unit 40, is determined from the expression (3), and the number of pixels (P) corresponding to the frame processing time (T) is calculated from the expression (1) (step S1032).

Next, the the numbers of pixels (P) and processing times (T) determined by the control unit 60 as described above are set to the camera unit 10 and the encoding unit 40 (step S1040).

The above processing is executed in the camera unit in which the number of pixels (P) and the frame processing time (T) are variable. When, however, it is determined at step S1000 that the number of pixels (P) and the frame processing time (T) are "fixed", i.e. in the camera unit 10 in which any one of the number of pixels (P) and the frame processing time (T) is fixed, the control unit 60 detects the performance of the camera unit 10 (step S1002). That is, the control unit 60 automatically determines the number of pixels (P) and the frame processing time (T) by detecting the number of fetched pixel and processing time the camera unit 10.

In this case, the processing, in which the user designates the photographing mode, is not employed, and the control unit 60 sets a parameter for automatically and uniquely determining a high resolution mode or a high rate fetching mode. Specifically, the frame processing time (T), which serves as a determination criterion of post processing that is changed depending on the high resolution mode and the high rate fetching mode, is determined, and when the control unit 60 determines that the camera unit 10 gives priority to resolution, the frame processing time (T) is set to 1/30 sec or more, and when the control unit 60 determines that the camera unit 10 can reads out data at a high rate although having a low pixel density, the frame processing time (T) is set to less than 1/30 sec. With the above arrangement, the post processing can be changed automatically.

Next, the control unit 60 sets the number of pixels (P) and the frame processing time (T), which are automatically set from the camera unit 10, to the encoding unit 40 (step S1004), and thereby the setting processing in the camera unit 10 is completed.

As described above, although the number of pixels (P) and the frame processing time (T) are set by somewhat different processing depending on whether the performance of the camera unit is variable or fixed, the camera unit 10, to which the number of pixels (P) and the frame processing time (T) are set as described above, reads out a frame image using predetermined the number of pixels (P) and the frame processing time (T), and the encoding unit 40 executes image compression processing (step S1050).

Here, at the final step of the image compression processing, the packets are rearranged as described below by the determination of the control unit 60. First, the control unit 60 determines the frame processing time (T) (step S 1060). When the determination at step S 1060 is "No", i.e., when it is determined that frame processing time (T) is 1/30 sec or more, the code stream is generated such that the packets of the JPEG 2000 are arranged in correspondence to the SN scalability (step S 1070). In contrast, when the determination at step S 1060 is "Yes", i.e., when it is determined that frame processing time (T) is less than 1/30 sec, the code stream is generated such that the packets of the JPEG 2000 are arranged in correspondence to the resolution scalability (step S 1072).

Next, the control unit 60 determines the state of recording unit 51 or the external unit connected to the external input output terminal 52, which receive and record the code stream generated by the above processes, according to the information of the state detected by the state detection unit 53 (step S1080). Specifically, the control unit 60 determines whether or not the recording unit 51 or the external unit is in a "busy" state, and as examples of the busy state, there are contemplated whether or not a recording operation overflows, whether or not a transmission path is busy, and whether or not various data can be received. In the example of the digital video camera (or digital still camera) on which the image generating apparatus of the present invention and the recording unit 51 are mounted, it is important to detect whether or not the recording unit 51 overflows the recording rate.

When the it is determined that the state is "normal" at step S1080, i.e. when it is determined that the receiving/recording state of the recording unit 51 is normal, the code stream is continuously output as it is (step S1090), and the receiving state is continuously monitored until the frame is completed (step S1100), and then the process is repeated from step S1080.

In contrast, when it is determined at step S1080 that the receiving/recording state is "busy", the output of the code stream is stopped once until the code stream of a next frame is output (step S1092). Then, when the next frame is started, the code stream generation change operation is repeated from step S1050 as long as it is not detected that the processing of the camera unit 10 is ended (step S1110).

When it is determined at step S1110 that the processing executed by the camera unit 10 is ended, the control unit 60 transfers the header information and the like and completes the recording operation, and then executes processing for generating a file format (step S1120), thereby the operation of this flow is ended.

Figure 10B:
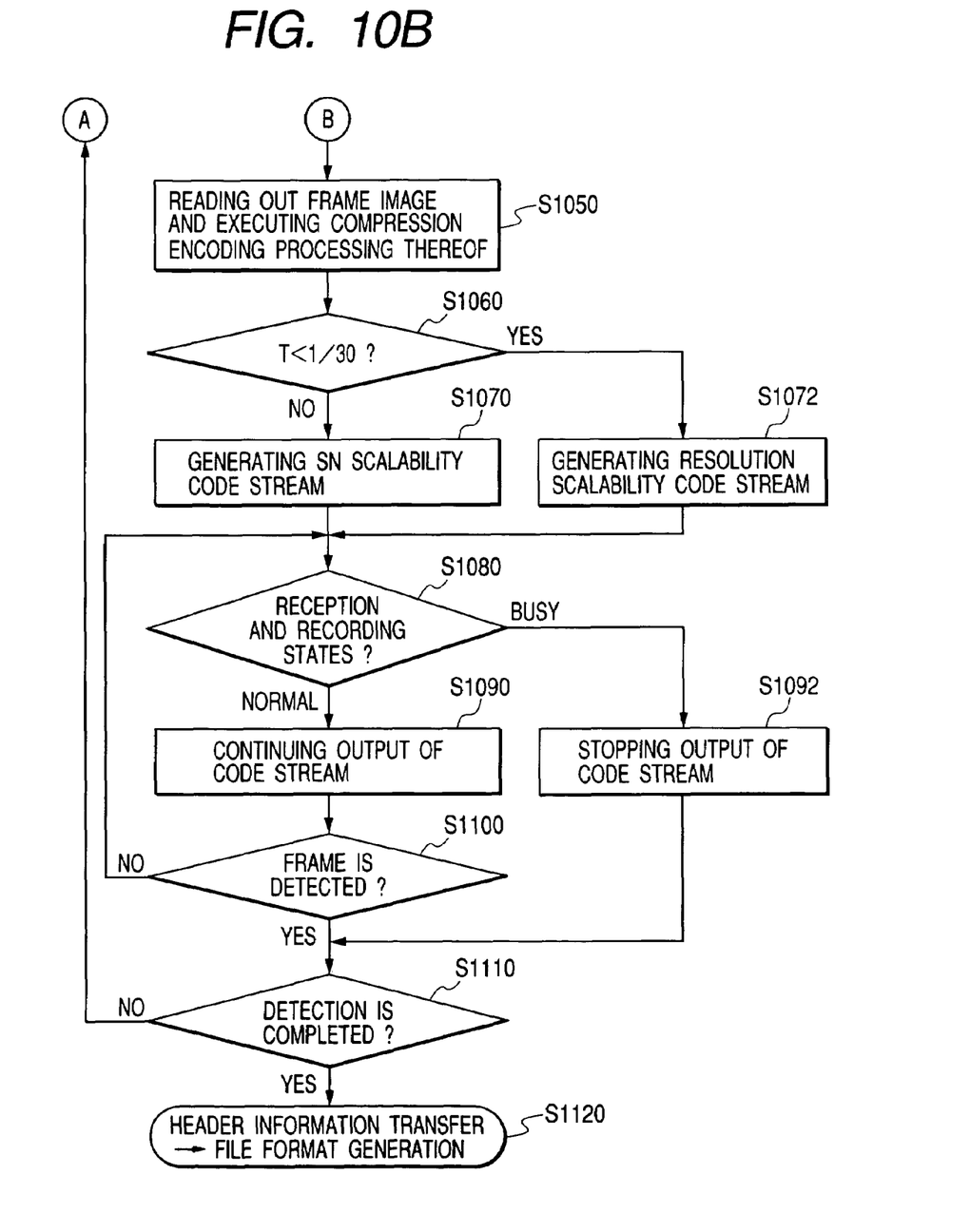

The flowchart of FIGS. 10A and 10B have been described above.

Since the processing executed by the camera unit 10 and the encoding unit 40 is changed between the resolution priority mode and the high rate fetching priority mode as described above, the code stream generated in the resolution priority mode can maintain image quality as high as possible in correspondence to the resolution priority mode as well as the code stream generated in the high rate fetching priority mode can fetch the instant motion of an object in it entirety as much as possible in correspondence to the high rate fetching priority mode.

It should be noted that although the recording unit 51 has been mainly explained as the unit to which the code stream is output in this embodiment, the same arrangement can be realized even if the external input output terminal 52 is exemplified as the unit to which the code stream is output. Further, even if the unit connected to the external input output terminal 52 is a network such as the Internet, the same effect can be obtained by controlling output of the code stream by detecting the busy state of the network by a TCP/IP protocol.

Further, even if the camera unit 10 and the encoding unit 40, which constitute the image generating apparatus of the embodiment, are integrated together with the recording unit 51 as in the digital video camera and the digital still camera, and even if the camera unit 10, the encoding unit 40, and the recording unit 51 are entirely or partly separated from each other, the present invention can be realized similarly.

Note that the recording unit 51 includes a disk-like recording medium such as a Blu-ray, DVD, and the like, a memory card such as an SD card, compact flash and the like, a recording medium such as a hard disc, tape, and the like and the recording units thereof. Further, the recording unit 51 may have a replay function.

Further, it is needless to say that the object of the present invention can be also achieved by supplying a recording medium, in which the program codes of software for realizing the functions of the embodiment of the present invention as described above are recorded, to a system or an apparatus and by reading and executing the program codes stored in the recording medium by the computer (or CPU or MPU) of the system or the apparatus.

In this case, the functions of the embodiment described above is realized by the program codes themselves read out from the recording medium, and the recording medium storing the program codes constitutes the present invention.

Further, it is needless to say that the case, in which not only the functions of the embodiment described above are realized by executing the program codes read out by the computer but also an operating system (OS) operating on the computer partly or entirely executes actual processing steps in response to the indications from the program code so that the functions of the embodiment described above are realized, is also included in the present invention.

As described above, according to the present invention, it is possible to generate the stream of a motion picture which makes full use of the characteristics of an image such as the high resolution and the high rate fetching, by changing the output of the stream according to the intervals at which an image frame are processed, and the number of pixels of the image frame.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image generating apparatus comprising:
   image pickup means for picking up an object image at predetermined time intervals and generating image pickup data;
   encoding means for encoding the image pickup data as motion picture image data having an image rate which is based on the predetermined time intervals;
   output means for outputting the motion picture image data encoded by the encoding means; and
   control means for controlling the output means to change the output mode of the motion picture image data output from the output means according to the number of pixels of the image pickup data picked up by the image pickup means and the image rate.

2. An apparatus according to claim 1, further comprising detection means for detecting the state of a receiving device for receiving the motion picture image data output from the output means,
   wherein the control means controls the output means according to the state information which is based on the state of the receiving device detected by the detection means.

3. An apparatus according to claim 2, wherein the control means controls the output means to start and stop a motion picture image data output thereof.

4. An apparatus according to claim 2, wherein the control means controls a motion picture image data output of the output means on a per picture basis.

5. An apparatus according to claim 2, wherein the detection means detects the receiving state of the receiving device.

6. An apparatus according to claim 2, wherein the receiving device is a recording device, and the detection means detects the recording state of the recording device.

7. An apparatus according to claim 1, further comprising read-out means for selecting and reading out a pixel range to be picked up by the image pickup means, and the predetermined time intervals in the image pickup means are set according to the number of pixels in the pixel range selected by the read-out means.

8. An apparatus according to claim 1, wherein the encoding means executes encoding using a sub-band encoding system, and the output means is arranged to select at least one type of scalability as the output mode of the motion picture image data.

9. An apparatus according to claim 8, wherein the output means is arranged to select a resolution scalability or an SN scalability as the output mode of the motion picture image data.

10. An apparatus according to claim 1, further comprising first memory means for storing information as to the image pickup capability of the image pickup means, second memory means for storing information as to the encoding capability of the encoding means, and setting means for setting the image pickup means and the encoding means using at least one of the respective information stored in the first and second memory means.

11. An image generating method comprising the steps of:
picking up an object image at predetermined time intervals and generating image pickup data;
encoding the image pickup data as motion picture image data having an image rate which is based on the predetermined time intervals;
outputting the motion picture image data encoded in the encoding step; and
controlling the output step to change the output mode of the motion picture image data of the output step according to the number of pixels of the image pickup data picked up in the picking up step and the image rate.

12. A method according to claim 11, further comprising a, step of detecting the state of a receiving device for receiving the motion picture image data output in the output step, wherein the control step controls the output step according to the state information which is based on the state of the receiving device detected in the detection step.

13. A method according to claim 11, further comprising a, read-out step for selecting and reading out a pixel range to be picked up in the picking up step, and the predetermined time intervals in the picking up step are set according to the number of pixels in the image range selected at the read-out step.

14. A storage medium storing a program executable by a data processing apparatus, the program including program codes for realizing an image producing method described in claim 11.

15. A storage medium storing a program executable by a data processing apparatus, the program including program codes for realizing an image producing method described in claim 12.

* * * * *